May 19, 1964  E. H. HARTEL  3,133,717
AIRCRAFT LANDING GEAR

Filed May 2, 1961  3 Sheets-Sheet 1

INVENTOR.
ERWIN H. HARTEL
BY
ATTORNEY

May 19, 1964

E. H. HARTEL 3,133,717

AIRCRAFT LANDING GEAR

Filed May 2, 1961

INVENTOR.
ERWIN H. HARTEL
BY
ATTORNEY

May 19, 1964

E. H. HARTEL 3,133,717

AIRCRAFT LANDING GEAR

Filed May 2, 1961

INVENTOR.
ERWIN H. HARTEL

BY

ATTORNEY

United States Patent Office 3,133,717
Patented May 19, 1964

3,133,717
AIRCRAFT LANDING GEAR
Erwin H. Hartel, Cleveland, Ohio, assignor to Cleveland Pneumatic Industries, Inc., Cleveland, Ohio, a corporation of Ohio
Filed May 2, 1961, Ser. No. 107,117
1 Claim. (Cl. 244—103)

The instant invention relates to aircraft landing gears having a plurality of landing gear wheels, in which the wheels may rotate independently of each other, as when the landing gear is steered, and in which the landing gear wheels are corotating at high speeds of rotation of the landing gear wheels, as in taking off or landing the aircraft.

It is quite common in aircraft landing gears for the landing gear to be provided with more than one landing gear wheel. When steering the aircraft by the landing gear, it is desirable that the several wheels of a landing gear rotate independently, for relative rotation of the wheels to prevent scrubbing of the same, which produces excessive wear of the tires under the heavy loads carried by the landing gear. However, when the aircraft is taking off or landing, it is desirable to provide damping means to prevent shimmy of the landing gear. Such shimmy, if not controlled and eliminated, produces vibration which subjects the aircraft and particularly the landing gear to excessive and undesirable strains and stresses. In an aircraft landing gear constructed in accordance with the instant invention, the wheels of the landing gear are connected to each other by damping means, which is operative at high speeds of relative rotation between the wheels to resist such relative rotation and thereby eliminate the undesirable shimmy of the landing gear. At low speeds of rotation of the landing gear wheels, as when the landing gear is steered, the damping means between the wheels is relatively ineffective, thus, permitting the wheels to rotate relatively to each other and thereby preventing scrubbing of the tires.

It is an important object of the instant invention to provide a novel and improved aircraft landing gear in which the landing gear wheels are easily rotatable relative to each other at low speeds of rotation to prevent scrubbing of the tires when the aircraft is turned, and including damping means operable to resist high speed relative rotation of the landing wheels to prevent shimmy of the landing gear.

It is another important object of the instant invention to provide a novel and improved aircraft landing gear having steering means, in which the landing gear wheels are easily rotatable relatively to each other during low speeds of relative rotation between the landing wheels which occur during steering of the landing gear to prevent scrubbing of the tires, and including damping means operable to resist high speed relative rotation of the landing wheels to prevent shimmy of the landing gear.

Another object of the instant invention is to provide a novel and improved aircraft landing gear having a simple and compactly constructed damping means and mounting therefor for resisting relative rotation of the wheels of the landing gear to eliminate shimmy.

Further objects and advantages of the instant invention will appear from the following description thereof, reference being had to the drawings, wherein.

Figure 1:
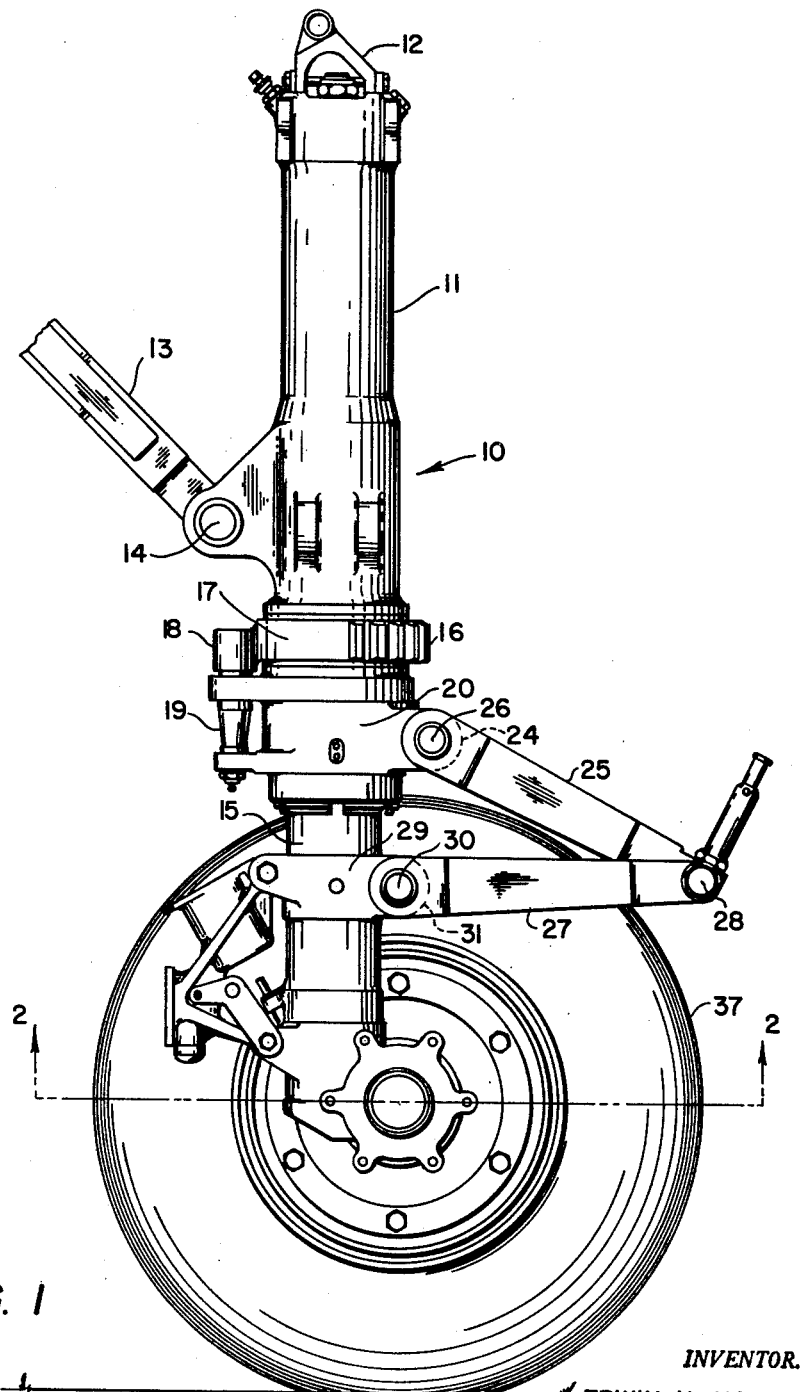
FIG. 1 is a side elevational view of a portion of a landing gear embodying the instant invention.

Referring to the drawings, there is illustrated in FIG. 1 an aircraft landing gear 10 embodying the instant invention and comprising an upright main strut 11 by which the landing gear 10 is supported on the frame of the aircraft. At the top of the main strut 11 there is provided a pair of lugs 12, one of which appears in FIG. 1, by which the landing gear 10 is pivotally connected to the aircraft frame to permit retraction of the landing gear 10 in a clockwise direction, as viewed in FIG. 1. There is additionally provided a drag brace 13 which is pivotally connected to the main strut 11 by pivot 14 at the lower end of the drag brace 13, and the upper end thereof is suitably connected to the aircraft main frame. It will be understood that the aircraft landing gear 10 and the connections thereof to the aircraft frame are only partially illustrated in FIG. 1, although the landing gear 10 is sufficiently illustrated therein for purposes of describing the invention, as will appear hereinafter.

The main strut 11 is formed as a cylinder element in the landing gear 10, and a piston element 15 is received in the lower end of the main strut 11 and is reciprocably supported therein. The main strut 11 and the piston element 15 include the usual shock absorbing structure for taking the impact loadings to which it is subjected, particularly during the landing of the aircraft. The shock absorbing structure may be of any suitable form and is not illustrated in detail herein, since it does not form a part of the instant invention.

The landing gear piston element 15 is rotatable relatively to the main strut 11 for steering of the landing gear 10. In order to accomplish steering, there is provided a steering gear segment 16 which is integrally formed on a collar 17, the latter being supported on the main strut 11 for rotation relatively thereto. A laterally extending extension 18 is integrally formed with the collar 17, diametrically opposite the steering gear segment 16. The lateral extension 18 has a depending torque pin 19 secured thereto. The torque pin 19 is connected to a steering collar 20, which is also rotatably mounted on the main strut 11. Any suitable steering motor may be provided for the landing gear 10, and the landing gear motor includes a rack, or the like, for engaging the steering gear segment 16 by which the collar 17 is rotated on the main strut 11. The steering torque is transmitted by the torque pin 19 to the steering collar 20, for rotation of the latter on the main strut 11 through the desired arc for producing steering movement of the landing gear 10 to the extent desired.

The steering collar 20 is provided with an integral lug 24 to which there is connected a first torque arm 25 by a suitable pivot connection 26. A second torque arm 27 is connected to the outer end of the first torque arm 25 by a suitable pivot connection 28. The inner end of the second torque arm 27 is pivotally connected to a collar 29, which is fixedly secured to the landing gear piston 15, the connection of the second torque arm 27 to the collar 29 being by a pivot connection 30, received in the second torque arm 27 and in a rearwardly extending lug 31 integrally formed with the collar 29. Upon the application of steering torque to the steering collar 20, the steering torque is transmitted by the first and second torque arms 25, 27 from the steering collar 20 to the collar 29 and to the landing gear piston element 15, for rotating the latter relatively to the main strut 11. Since the first and second torque arms 25, 27 are pivotally connected to each other, and to the main strut 11 and to the landing gear piston element 15 in an upright plane which includes the axes of the main strut 11 and the piston element 15, the landing gear piston element 15 is free to reciprocate relatively to the main strut 11, with the first and second torque arms 25, 27 merely folding and unfolding during such reciprocation.

Figure 2:
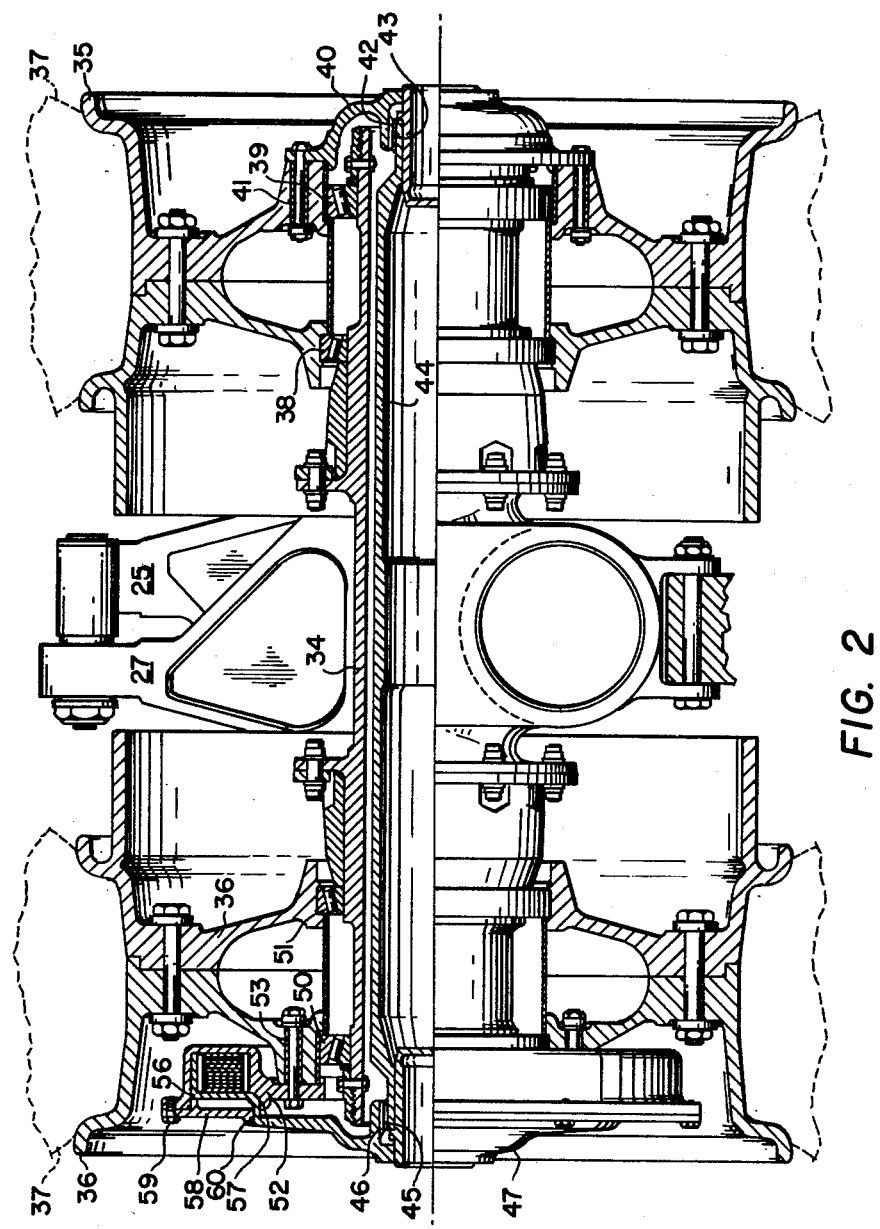
FIG. 2 is a partial sectional view of the aircraft landing gear taken on the line 2—2 in FIG. 1.
Figure 3:
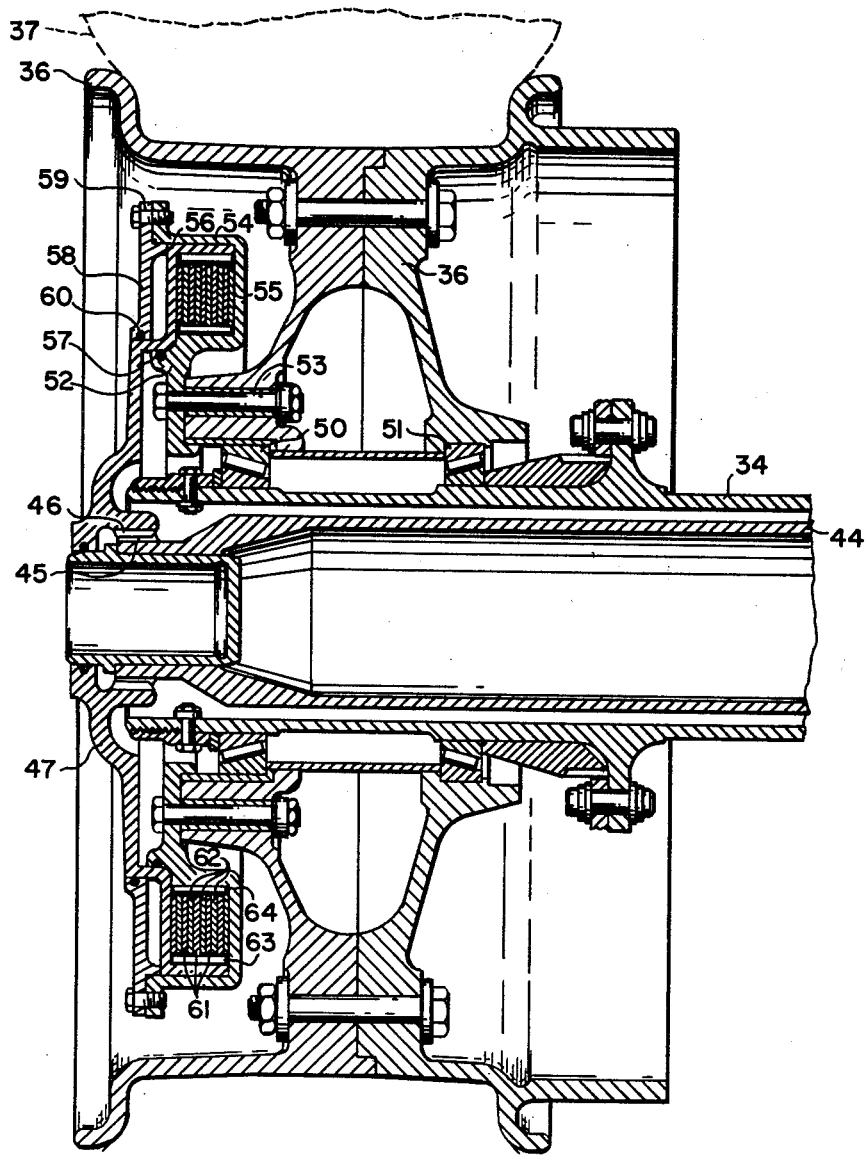
FIG. 3 is an enlarged sectional view of one side of the aircraft landing gear showing the wheel coupling means.

The landing gear 10 includes a hollow axle 34, as best seen in FIG. 2, which is disposed at the lower end of the landing gear piston element 15, and extends laterally to opposite sides thereof for rotatably supporting a first landing gear wheel 35 at one side of the landing gear piston element 15, and a second landing gear wheel 36 at the other side thereof. Each of the landing gear wheels 35, 36 carries a suitable ground engaging tire 37.

The landing gear wheel 35 is rotatably supported on the axle 34 by a pair of axially spaced bearings 38, 39, which are interposed between the wheel 35 and the axle 34 and held in place by suitable bearing retaining devices. An end cap 40 is secured to the first landing gear wheel 35 by a plurality of circumferentially disposed bolts 41, for rotation of the end cap 40 with the landing gear wheel 35. The end cap 40 is formed with internal splines 42, which are mated with external splines 43 formed on one end of a torque tube 44. The torque tube 44 is disposed within the hollow axle 34, and is laterally co-extensive therewith. The opposite end of the torque tube 44 is also formed with external splines 45, which are mated with the internal splines 46 of a first rotor 47. Thus, the landing gear wheel 35 is operative to rotate the torque tube 44, which in turn rotates the first rotor 47 at the same speed as the first landing gear wheel 35.

The second landing gear wheel 36 is rotatably mounted on the axle 34 by a pair of axially spaced bearings 50, 51, which are secured in position on the axle 34 by suitable bearing retaining devices. Each of the landing gear wheels 35, 36 is independently mounted on the axle 34 for rotation relative thereto, whereby the wheels 35, 36 are independently rotatable on the axle 34 and can rotate relatively to each other with the wheels 35, 36 both rotating in the same direction, or rotating in opposite directions. A second rotor 52 is secured to the second landing gear wheel 36 by a plurality of bolts 53, or the like, for rotation of the second rotor 52 with the landing gear wheel 36. The second rotor 52 is formed with a recessed annulus 54 which faces outwardly with respect to the wheel 36, and defines a chamber 55. The first rotor 47 extends in a radial direction adjacent the second rotor 52, and is formed with an annulus 56 that is mated with the recessed annulus 54, to provide a closure for the chamber 55 that is defined by the recessed annulus 54. An O-ring 57 is disposed between the first and second rotors 47, 52 to provide a dynamic fluid seal at the junction thereof. Annular cap 58 is secured to the second rotor 52 outside of the annulus 56 of the first rotor 47, to maintain the annulus 56 of the first rotor 47 in engagement with the recessed annulus 54 of the second rotor 52. The annular cap 58 may be secured to the second rotor 52 by a plurality of bolts 59, or the like. An O-ring 60 is interposed between the annular cap 58 and the first rotor 47 to provide a dynamic fluid seal at the junction of these elements. Thus, the first rotor 47 is rotatable relatively to the second rotor 52 and the annular cap 58 that is secured to the second rotor 52. The chamber 55, which is formed between the annular portions of the first and second rotors 47, 52 is adapted to be filled with fluid for a purpose to be described in greater detail hereinafter, and the O-rings 57, 60 provide seals between the first rotor 47 and the second rotor 52 and the annular cap 58 to prevent the loss of fluid from the chamber 55, as by leakage.

The first and second rotors 47, 52 form a damping device connected between the first landing gear wheel 35 and the second landing gear wheel 36 for resisting relative rotation of the landing gear wheels 35, 36. Within the chamber 55, there is provided a first set of coupling discs 61, and a second set of coupling discs 62, with the coupling discs 61 of the first set being alternated with the coupling discs 62 of the second set. The coupling discs 61 are keyed to the first rotor 47, as by a plurality of circumferentially disposed pins 63, and the coupling discs 62 of the second set are keyed to the second rotor 52, as by a plurality of circumferentially disposed pins 64. Thus, the coupling discs 61 are keyed to the first rotor 47 for rotation therewith, and the coupling discs 62 are keyed to the second rotor 52 for rotation with the latter. As previously described, the chamber 55 within which the coupling discs 61, 62 are housed is filled with fluid in which the coupling discs 61, 62 are completely immersed. The coupling discs 61, 62 are disposed within the chamber 55 with slight clearance between the adjacent discs 61, 62, which may be of the order of .005 inch, so that the fluid contained within the chamber 55 flows between the coupling discs 61, 62. The fluid flowing between the adjacent coupling discs 61, 62 adheres to the surfaces thereof, and the tendency of the discs 61, 62 to rotate relatively to each other will be opposed by the shear resistance of the fluid flowing between the adjacent coupling discs 61, 62. At low speeds of relative rotation of the landing gear wheels 35, 36, the resisting torque is small so the fluid provides little resistance to relative rotation of the landing gear wheels 35, 36. However, at high speeds of relative rotation of the landing gear wheels 35, 36, as during shimmy in takeoff or landing of the aircraft, the shear resistance of the fluid flowing between the coupling discs 61, 62 provides a much higher resisting torque to prevent relative rotation of the coupling discs 61, 62, thereby providing the necessary damping to eliminate shimmy.

The instant invention is particularly applicable to a steering landing gear such as that illustrated herein, in which there is a landing gear wheel disposed at each side of the landing gear main strut. In this type of landing gear, when steering occurs, there is translation of the landing gear wheels about a center on the axis of the landing gear main strut, with the landing gear wheels rotating in opposite directions. With the instant invention, the landing gear wheels are free to rotate in opposite directions at the slow speed of relative rotation which occurs during the steering thereof, with the damping means remaining ineffective due to the low speed of relative rotation of the landing gear wheels. However, when the landing gear wheels are rotated at high speeds of rotation, as during take-off and landing the damping means is effective to eliminate shimmy.

The shimmy of the landing gear which is prevented by the instant invention manifests itself as an oscillatory motion during which the opposite wheels of the landing gear rotate relatively to each other. By the inclusion of the damping means described herein, the aforementioned oscillatory motion is damped out to such extent as to become imperceptible. Thus, the damping means interposed between the plural wheels of the landing gear damps the undesirable shimmy or oscillation by introducing into the system a resistance to high rates of relative rotation of the wheels occurring during shimmy.

It will be understood that those skilled in the art may make various changes in the details and arrangements of parts without departing from the spirit and scope of the invention as defined by the claim hereto appended, and it is therefore desired that the invention not be restricted to the precise construction herein disclosed.

Having thus described and shown an embodiment of the invention, what it is desired to secure by Letters Patent of the United States is:

An aircraft landing gear comprising an elongated strut, a hollow fixed axle extending from opposite sides of said strut, wheels journaled on said axle for rotation relative to said strut and rotation relative to each other, one of said wheels being mounted on each side of said strut, an annular damper housing, a rotor extending into said housing cooperating therewith to define an annular chamber, seals between said rotor and said housing at the radially inner side thereof cooperating with said rotor and housing to make said chamber fluid-tight, first radially extending parallel and spaced discs in said chamber fixed against rotation relative to said housing, second radially extending parallel and spaced discs interleafed between said first discs and fixed against rotation relative to said rotor, a viscous liquid in said chamber immersing said discs, a mounting securing said housing directly to one of said wheels for rotation therewith, a torque member extending through said hollow axle, a mounting cap connecting one end of said torque member to the other of said wheels securing said one end against rotation and radial movement relative to said other wheel, an inwardly extending flange on said rotor connected to the other end of said torque member preventing relative rotation between said rotor and said torque member, said rotor providing surfaces engaging said housing and preventing radial movement of said rotor at said other end of said torque member relative to said housing.

References Cited in the file of this patent
UNITED STATES PATENTS

| | | |
|---|---|---|
| 2,401,364 | Mercier | June 4, 1946 |
| 2,602,612 | Zimmerman et al. | July 8, 1952 |
| 2,620,235 | Butler | Dec. 2, 1952 |
| 2,644,654 | Mercier | July 7, 1953 |
| 2,661,915 | O'Connor | Dec. 8, 1953 |
| 2,905,505 | Delker et al. | Sept. 22, 1959 |